US006497979B1

United States Patent
Iijima et al.

(10) Patent No.: US 6,497,979 B1
(45) Date of Patent: Dec. 24, 2002

(54) METHOD OF PRODUCING ELECTRODE FOR NON-AQUEOUS ELECTROLYTIC CELLS INCLUDING A NARROW-GAP DISPERSING PROCESS

(75) Inventors: Tadayoshi Iijima; Shigeo Kurose, both of Saku; Tetsuya Takahashi, Nagano, all of (JP); David V. Adamson, Ashland, MA (US); Ignacio Chi, Dracut, MA (US); George Cintra, Holliston, MA (US); Karthik Ramaswami, Framingham, MA (US)

(73) Assignees: TDK Corporation, Tokyo (JP); Duracell, a division of the Gillette Company, Bethel, CT (US)

( * ) Notice: Subject to any disclaimer, the term of this patent is extended or adjusted under 35 U.S.C. 154(b) by 0 days.

(21) Appl. No.: 09/423,670
(22) PCT Filed: May 27, 1998
(86) PCT No.: PCT/JP98/02320
§ 371 (c)(1),
(2), (4) Date: Nov. 23, 1999
(87) PCT Pub. No.: WO98/54774
PCT Pub. Date: Dec. 3, 1998

(30) Foreign Application Priority Data

May 27, 1997 (JP) .............................. 9-136657

(51) Int. Cl.$^7$ ................................ H01M 4/52
(52) U.S. Cl. .................. 429/223; 429/224; 429/231.95; 29/623.1
(58) Field of Search ................. 429/223, 224, 429/231.95; 29/623.1

(56) References Cited

U.S. PATENT DOCUMENTS 5,518,842 A * 5/1996 Fey .......................... 429/218
5,580,679 A    12/1996 Tanaka
5,679,481 A * 10/1997 Takanishi ................... 429/223
5,718,989 A *  2/1998 Aoki ......................... 429/218
5,985,488 A * 11/1999 Mitate ....................... 429/223

FOREIGN PATENT DOCUMENTS

| EP | 0 284 104 A2 | 9/1988 |
| EP | 0 789 412 A1 | 8/1997 |
| WO | 96/13873 | 5/1996 |
| WO | 97/12409 | 4/1997 |

OTHER PUBLICATIONS

Abstract of Japanese Patent Publ. No. 10233205; dated Sep. 2, 1998.
Abstract of Japanese Patent Publ. No. 09293510; dated Nov. 11, 1997.

(List continued on next page.)

*Primary Examiner*—Gabrielle Brouillette
*Assistant Examiner*—Mark Ruthkosky
(74) *Attorney, Agent, or Firm*—Arent Fox Kintner Plotkin & Kahn, PLLC

(57) ABSTRACT

A method for producing an electrode for a non-aqueous electrolyte battery which improves charge/discharge characteristics such as a discharge capacity and a charge/discharge cycle life and which provides improved physical properties of a coating film.

The method includes the steps of wet-kneading a slurry containing an active material having a composition of $Li_xNi_yM_zO_2$ ($0.8<x<1.5$, $0.8<y+z<1.2$, $0\leq z<0.35$; M is at least one element selected from Co, Mg, Ca, Sr, Al, Mn and Fe), an electrically conductive agent, a binder and an organic solvent, and then performing a dispersion process on the wet-kneaded slurry by means of a narrow-gap-type dispersing apparatus to prepare a mixture coating material, which is then applied onto a collector.

3 Claims, 1 Drawing Sheet

OTHER PUBLICATIONS

Abstract of Japanese Patent Publ. No. 09171816; dated Jun. 30, 1997.
Abstract of Japanese Patent Publ. No. 08195201; dated Jul. 30, 1996.
Abstract of Japanese Patent Publ. No. 07161348; dated Jun. 23, 1995.

Abstract of Japanese Patent Publ. No. 01105459; dated Apr. 21, 1989.

Abstract of Japanese Patent Publ. No. 04215252; dated Aug. 6, 1992.

* cited by examiner

METHOD OF PRODUCING ELECTRODE FOR NON-AQUEOUS ELECTROLYTIC CELLS INCLUDING A NARROW-GAP DISPERSING PROCESS

TECHNICAL FIELD OF THE INVENTION

The present invention relates to a method for producing an electrode for a non-aqueous electrolyte battery, and more particularly to a method for producing a non-aqueous electrolyte battery electrode which includes an electrode active material layer containing an active material having a composition of $Li_xNi_yM_zO_2$ (where x satisfies $0.8<x<1.5$, y+z satisfies $0.8<y+z<1.2$, z satisfies $0 \leq z<0.35$, and M is at least one element selected from Co, Mg, Ca, Sr, Al, Mn and Fe) and having excellent battery characteristics and excellent physical properties of the active material layer.

TECHNICAL BACKGROUND OF THE INVENTION

Recent development in the electronic field is remarkable, and reduction in size and weight of devices such as video cameras, liquid crystal cameras, portable telephones, laptop computers, and word processors is now taking place. There are increasing needs for development of batteries with reduced size and weight and having a high energy density as power sources for these electronic devices.

Conventionally, lead batteries or nickel-cadmium batteries have been used for these electronic devices. These conventional batteries cannot sufficiently meet the needs for reduction in size and weight and achievement of a high energy density.

As batteries that meet these demands, development of non-aqueous electrolyte secondary batteries employing metal lithium or a substance capable of being doped and undoped with lithium as a negative electrode has been carried out, whereby those using a lithium cobalt oxide ($LiCoO_2$) as a positive electrode material are already in practical use. This battery has a property of having a high voltage and a high energy density as compared with the conventional small secondary batteries. Therefore, they are greatly expected as a power source for driving a cordless devices, so that secondary batteries which are smaller and lighter than the conventional batteries can be fabricated.

Also, in order to achieve further reduction in size and weight and to obtain a further high energy density, development and research of active materials etc. is eagerly conducted, and a lithium nickel composite oxide $LiNiO_2$ is proposed as a positive electrode active material.

Here, in the electrode of a non-aqueous electrolyte battery, an electrically conductive agent is used because the active material has a poor electric conductivity except for some active materials.

For example, Japanese Laid-open Patent Publication No. 1-105,459/1989 discloses a non-aqueous electrolytic solution secondary battery including a positive electrode containing $LiMn_2O_4$ and graphite as major components, a negative electrode, and a non-aqueous electrolytic solution, wherein a graphite content in the total amount of the above $LiMn_2O_4$ and the graphite is 8 to 22 wt %. This means that, in using graphite as an electrically conductive agent, effects are not produced unless the graphite is added in a large amount.

Japanese Laid-open Patent Publication No. 4-215,252/1992 discloses use of a flake graphite as an electrically conductive agent for a positive electrode in a non-aqueous electrolyte secondary battery. In this way, although there are disclosures on electrically conductive agents made of graphite, the prior art fails to disclose a method of preparing a slurry.

Generally, the larger the amount of the electrically conductive agent is, the easier it is to draw out the efficiency of the active material. However, if a large amount of the electrically conductive agent is incorporated in the electrode, the amount of the active material per unit volume will decrease, so that as a result the capacity as a battery will decrease. Therefore, attempts are made to reduce the amount of the electrically conductive agent while drawing out the efficiency of the active material.

However, according to the conventional methods of preparing an electrode mixture-coating material, a large amount of the electrically conductive agent must be added in the electrode mixture in order to obtain a sufficient electrode conducting property. As a result, there arises a problem that the charge/discharge capacities per unit electrode volume or per unit electrode weight decreases.

Also, non-aqueous electrolyte secondary batteries get deteriorated in that their capacity decreases in accordance with their repeated use. One of the factors that cause such a deterioration of the batteries is considered to be that the contact of the active material and the electrically conductive agent in the electrode gets poorer, making it difficult to draw out an electricity to the outside.

In view of these facts, it is desirable to maintain a good contact of the active material and the electrically conductive agent in the electrode while reducing the amount of the electrically conductive agent of graphite as much as possible.

DISCLOSURE OF THE INVENTION

Objects of the Invention

Accordingly, the purpose of the present invention is to solve the above-mentioned problems of the prior art and to provide a method for producing an electrode for a non-aqueous electrolyte battery with improved charge/discharge characteristics such as a discharge capacity and a charge/discharge cycle life and with improved physical properties of a coating film.

SUMMARY OF THE INVENTION

The present inventors have made an eager research and found out that an electrode having good charge/discharge characteristics and stable physical properties of the coating film can be obtained even with a small amount of an electrically conductive agent by wet-kneading a slurry containing an active material and the electrically conductive agent and then performing a special dispersion process in preparing an electrode active material mixture-coating material, thereby completing the present invention.

Accordingly, the present invention provides a method for producing an electrode for a non-aqueous electrolyte battery by preparing an electrode active material mixture-coating material containing at least an active material having a composition of $Li_xNi_yM_zO_2$ (where x satisfies $0.8<x<1.5$, y+z satisfies $0.8<y+z<1.2$, z satisfies $0 \leq z<0.35$, and M is at least one element selected from Co, Mg, Ca, Sr, Al, Mn and Fe), an electrically conductive agent and a binder, and by applying said active material mixture-coating material on a collector, said method comprising the steps of wet-kneading a slurry containing at least said active material, said electrically conductive agent, said binder and an organic solvent, and then performing a dispersion process on said wet-kneaded slurry by means of a narrow-gap-type dispersing apparatus to prepare the mixture-coating material.

In the present invention, a concentration of solid components in the slurry at the wet-kneading step is preferably 70 to 90 wt %.

Also, in the present invention, the wet-kneading step is performed preferably in an atmosphere of air, nitrogen gas, or a rare gas having a moisture dew point of not more than −20° C.

According to the present invention, since the slurry is wet-kneaded and then subjected to the dispersion process by means of the narrow-gap-type dispersing apparatus in preparing the active material mixture-coating material, a sufficient electric conductivity of the electrode can be obtained with a small amount of the electrically conductive agent. As a result, an amount of the active material per unit electrode volume can be increased and large charge/discharge capacities per unit electrode volume can be obtained. Also, physical properties of a coating film can be stabilized.

DETAILED DESCRIPTION OF THE INVENTION

The active material to be used in the present invention is a lithium composite oxide represented by the general formula: $Li_xNi_yM_zO_2$ (where x satisfies 0.8<x<1.5, y+z satisfies 0.8<y+z<1.2, z satisfies 0≦z<0.35, and M is at least one element selected from Co, Mg, Ca, Sr, Al, Mn and Fe).

In the present invention, an average particle diameter of the above-mentioned lithium composite oxide is preferably within the range of 1.0 to 30 μm, more preferably within the range of 2.0 to 20 μm. A half-value width at the average particle diameter of its particle size distribution is preferably within the range of 2.0 to 50 μm. The particle size distribution is measured by the laser diffraction/scattering method.

An example of a method for producing such a lithium composite oxide is, for example, a process in which a basic metal salt and an alkaline water-soluble lithium compound containing respectively an anion that volatilizes at the time of calcination of $LiMetal^{3+}O_2$ (where the Metal contains Ni as a major component and further contains at least one element selected from Co, Mg, Ca, Sr, Al, Mn and Fe) are allowed to react in an aqueous medium to obtain a slurry, which is then dried and calcined.

The basic metal salt is represented by the general formula: $Metal^{2+}(OH)_{2-nk}(A^{n-})_k \cdot mH_2O$. Here, the $Metal^{2+}$ is an ion containing Ni as a major component and possibly containing at least one element selected from Co, Mg, Ca, Sr, Al, Mn and Fe. $A^{n-}$ represents an anion with n valences (where n=1 to 3) such as a nitrate ion, a chloride ion, a bromide ion, an acetate ion, or a carbonate ion. Further, k satisfies 0.03≦k≦0.3; and m satisfies 0≦m<2.

The basic metal salt represented by the above-mentioned formula can be produced by adding to an aqueous solution of $Metal^{2+}$ an alkali of about 0.7 to 0.95 equivalent, preferably about 0.8 to 0.95 equivalent, relative to the $Metal^{2+}$, and reacting them under a reaction condition of about 80° C. or less, and then maturing the reaction product at a temperature of 40° C. to 70° C. for 0.1 to 10 hours, followed by washing with water to remove the by-products. The alkali to be used in the reaction may be a hydroxide of an alkali metal such as sodium hydroxide, a hydroxide of an alkali earth metal such as calcium hydroxide, an amine, or the like.

A basic metal salt selected from the compounds represented by the above-mentioned formula and one or more lithium compounds selected from lithium hydroxide, lithium carbonate, hydrates thereof, and the like are allowed to react in water at a concentration in the range of 5 to 25 wt % and at a temperature in the range from room temperature to 100° C. to obtain a slurry, which is then subjected to spray drying for improvement of uniformity in the shape of the composition to be obtained.

The lithium composite oxide can be obtained by subjecting the dried product to a thermal treatment for calcination in an oxidizing gas atmosphere containing air, oxygen, ozone, or the like in a temperature range of about 700 to 1000° C. for about 0.1 to 20 hours.

Another example of a method for producing a lithium composite oxide to be used in the present invention is a process that uses a water-soluble lithium compound and a basic metal carbonate obtained from a water-soluble metal compound.

The water-soluble metal compound to be used in this process is a nitrate, a sulfate, a metal chloride, or the like. This water-soluble metal compound may contain a nickel compound as a major component and may be mixed with a given amount of another water-soluble metal compound so that at least one element selected from Co, Mg, Ca, Sr. Al, Mn and Fe may be blended therewith.

The basic metal carbonate may be obtained by filtrating and drying a precipitate obtained by allowing a mixture of the above-mentioned water-soluble metal compounds to react with a compound selected from the group consisting of an alkali carbonate, an alkali bicarbonate, ammonium carbonate and ammonium bicarbonate in water, or a precipitate obtained by allowing sodium hydroxide to be present for reaction in the above-mentioned reaction system. In this case, in order to produce a good precipitate, it is preferable to use a little excessive amount of the carbonate, and also it is important to control the stirring condition so as to control the specific surface area of the precipitate.

To the basic metal carbonate thus obtained, a powder of a water-soluble lithium compound such as lithium carbonate or lithium hydroxide is added at a desired ratio of the metal to Li. The resultant mixture in a powder state is first heated to 300 to 500° C. in the presence of an inert gas or an oxygen-containing gas. This heating allows only the decomposition of the basic metal carbonate to proceed, whereby carbonic acid gas in the crystal structure is released. This heating is continued until the generation of the carbonic acid gas substantially stops so as to convert all of the basic metal carbonate into a metal oxide having numerous fine pores.

After the generation of carbonic acid gas substantially stops, the temperature is further raised to allow the molten water-soluble lithium compound to penetrate into the fine pores of the metal oxide, whereby the two compounds will be in an extremely close contact. At this moment, the resultant product is calcined at a temperature of 700 to 900° C. in the presence of oxygen gas or an air rich in oxygen, whereby Ni is turned from bivalent to trivalent to produce a Li composite oxide.

Here, the larger the specific surface area of the basic metal carbonate to be used is (for example, more than 100 $m^2/g$), the more preferable it is, because gas discharge and generation of fine pores after preliminary calcination will be more efficiently performed.

The electrically conductive agent to be used in the present invention is not specifically limited and may be any electron-conducting material that does not undergo a chemical change. Examples of the electrically conductive agent typically include graphites such as natural graphite (scaled graphite, scale-like graphite and others) and artificial graphite, carbon blacks such as acetylene black, Ketjen black, channel black, furnace black, and thermal black, electrically conductive fibers such as carbon fiber, carbon fiber grown in gaseous phase, and metal fiber, and metal powders such as copper, nickel, aluminum, and silver. Among these, scale-like graphite is preferable.

Specifically, the electrically conductive agent may be one of the LF series manufactured by Chuuetsu Kokuen Kogyosho Co., Ltd., the UFG series manufactured by Showa Denko Co., Ltd., the KS series manufactured by LONZA Co., Ltd., MICROCARBO-G series manufactured by Kansai Netsukagaku Co., Ltd., Ecoscarbons manufactured by Ecos Giken Co., Ltd., and others.

The amount of the electrically conductive agent to be blended is preferably 1 to 15 wt %, more preferably 2 to 10 wt %, in a dried coating film, although it depends on the specific surface area of the active material and the like.

The binder to be used in the present invention is one or a mixture of two or more of thermoplastic resins or polymers having a rubber elasticity. Examples of the binders to be used include fluorine-type polymers, polyvinyl alcohol, carboxymethyl cellulose, hydroxypropyl cellulose, regenerated cellulose, diacetyl cellulose, polyvinyl chloride, polyvinyl pyrrolidone, polyethylene, polypropylene, EPDM, sulfonated EPDM, SBR, polybutadiene, polyethylene oxide, and the like.

Among these, the fluorine-containing polymer preferably has an atomic ratio of fluorine atoms/carbon atoms in the range of 0.75 to 1.5, more preferably in the range of 0.75 to 1.3. If this value is larger than 1.5, it tends to be difficult to obtain a sufficient capacity of the battery. On the other hand, if it is smaller than 0.75, the binder is likely to be dissolved in the electrolytic solution.

Examples of such fluorine-containing polymers include polytetrafluoro-ethylene, polyvinylidene fluoride, vinylidene fluoride-ethylene trifluoride copolymers, ethylene-tetrafluoroethylene copolymers, propylene-tetrafluoroethylene copolymers, and the like. A fluorine-containing polymer with its hydrogen in the main chain substituted by an alkyl group(s) may be used as well.

Among these, those showing a selective solubility (having a low solubility in the electrolytic solution and being soluble in some solvents). For example, vinylidene fluoride-type polymers are only slightly soluble in a carbonate-type solvent that is used as the electrolytic solution or the like, but are soluble in a solvent such as N,N-dimethylformamide or N-methylpyrrolidone.

The amount of the binder to be added is preferably 1 to 15 wt %, more preferably 2 to 10 wt %, in a dried coating film, although it depends on the specific surface areas and the particle size distributions of the active material and the electrically conductive agent, the strength of the intended electrode, and the like.

The solvent to be used for the preparation of the electrode active material mixture-coating material is not specifically limited and may be a general organic solvent. Examples of the organic solvents include saturated hydrocarbons such as hexane, aromatic hydrocarbons such as toluene and xylene, alcohols such as methanol, ethanol, propanol, and butanol, ketones such as acetone, methyl ethyl ketone, methyl isobutyl ketone, diisobutyl ketone, and cyclohexanone, esters such as ethyl acetate and butyl acetate, ethers such as tetrahydrofuran, dioxane, and diethyl ether, amides such as N,N-dimethylformamide, N-methylpyrrolidone, and N,N-dimethylacetamide, halogenated hydrocarbons such as ethylene chloride and chlorobenzene, and the like. Among these, ketone-type and amide-type solvents are preferable because they can dissolve the fluorine-containing polymers. These solvents may be used either alone or as a mixture of two or more thereof.

In the present invention, a slurry containing the active material, the electrically conductive agent, the binder and the organic solvent as mentioned above is wet-kneaded and then subjected to a dispersion process by means of a narrow-gap-type dispersing apparatus to prepare a mixture-coating material. Through these steps, it is possible to remove efficiently a secondary agglomeration or a stack of the electrically conductive agent, whereby a sufficient electrically conductive effects are produced even if only a small amount of the electrically conductive agent is added. Also, the physical properties of the coating film is stabilized.

For example, an explanation will be given on a case where graphite is used as the electrically conducive agent. Since graphite has a cleavage property, graphite having a large particle diameter can be cleft to increase its specific surface area with little decrease in the particle diameter. However, graphite is liable to form a stack and, if a strong shear stress or the like is applied in a dry process to loosen the stack, it is likely to be stacked to a greater extent. For example, if an attempt is made to crush graphite with a ball mill or the like, there arises a problem that the graphite is liable to be stacked, although it can be crushed. Therefore, it was difficult in the prior art to cleave the stack without breaking the graphite particles. According to the operation of the present invention, the stack of graphite can be effectively removed, and sufficient electrically conducting effects can be obtained even with addition of only a small amount of graphite.

Further, an explanation will be given on a case where acetylene black is used as the electrically conductive agent. Acetylene black is liable to form large secondary agglomerates. By a conventional dry process or a conventional dispersion method, it is not easy to loosen the agglomeration of acetylene black particles, so that a large amount of acetylene black had to be added in the electrode mixture-coating material in order to obtain sufficient electrical conductivity. According to the operation of the present invention, it is possible to loosen the secondary agglomerates of acetylene black, whereby sufficient electrically conducting effects can be obtained even with addition of only a small amount of acetylene black.

In the present invention, the wet-kneading is conducted in a kneading apparatus such as a kneader, a planetary mixer, a two-roll rolling mill, a three-roll rolling mill, a Banbury mixer, and the like. The kneader is an apparatus that gives a shear between a rotating blade and a kneading tank. The kneader may be of a single-process type or a continuous-process type. Either of these two types may be used.

Examples of single-process type kneaders include an open-type kneader, pressure-type kneader, and the like. Since the open-type kneader is open at its top, voids are generated, so that it is rather unsuitable for achieving the object of the present invention. The pressure-type kneader can produce the effects of the present invention in the most efficient manner because the voids can be controlled to the minimum. Also, the kneader of continuous process type does not decrease the effects of the present invention because it has a feeding structure, although it slightly generates voids as compared with the pressure type. The kneader of continuous process type is preferable because it can carry out the steps continuously including the preprocesses such as preliminary mixing and the postprocesses such as kneading, dilution, and dissolution.

Examples of the rotating blade to be used in such a kneader include a Σ-type blade, a Z-type blade, a cam-type blade, a roller-type blade, an S-type blade, a fishtail-type blade, and a Banbury-type blade.

Examples of the kneader include single-type kneaders such as an MS-type pressure-type kneader manufactured by Moriyama Co., Ltd., continuous kneaders such as KRC kneaders manufactured by Kurimoto, Ltd., and extruders manufactured by a Fuji Powdernel, Kobe Seitetsusho, Toshiba Machine Co., Ltd., and further, small-type kneaders such as a desktop-type kneader manufactured by Irie Shokai Co., Ltd., a kneader manufactured by Takabayashi Rika Co., Ltd., a Laboplastomill and a Blavender manufactured by Toyo Seiki Co., Ltd.

A concentration of solid components in the slurry at the time of the wet-kneading step is preferably within the range of 70 to 90 wt %. If the concentration is too larger or too smaller than the above range, it is not possible to obtain a sufficient shear force.

Also, the wet-kneading step is preferably carried out in an atmosphere of air, nitrogen gas, or a rare gas having a moisture dew point of not more than $-20°$ C. If the slurry is wet-kneaded in such an atmosphere, it is possible to prevent the above-mentioned $Li_xNi_yM_zO_2$, which is the active material, from undergoing a decomposition reaction, so that the charge/discharge capacities do not decrease.

A slurry temperature at the time of the wet-kneading step is preferably within the range of 30 to 90° C. If the slurry temperature is below 30° C., it will be difficult to obtain a sufficient shear force. On the other hand, if the slurry temperature exceeds 90° C., the organic solvent in the slurry is likely to evaporate, thereby changing the concentration of solid components in the slurry.

By means of the above-mentioned kneading apparatus and the kneading operation, the slurry containing the active material, the electrically conductive agent, the binder and the organic solvent is sufficiently kneaded. The kneaded slurry is then diluted to have a suitable viscosity and dispersed in a narrow-gap-type dispersing apparatus.

The narrow-gap-type dispersing apparatus to be used in the present invention may be a Gaulin homogenizer, a high-speed stone mill, an ultradisper, or the like. Any of the above-mentioned dispersing apparatus gives a shear by passing a kneaded coating material through a narrow gap. By performing such a dispersing process, fine portions such as stacks of graphite or secondary agglomerates of acetylene black can be dispersed to a higher degree. Therefore, the maximum effects of the electrically conductive agent can be obtained with addition of the minimum amount of the electrically conductive agent.

Also, in accordance with the needs, a final adjustment may be made by dispersion in a stirring mixer, such as a hyper mixer or a dissolver, so that the electrode active material mixture-coating material may meet the condition of a coating apparatus.

The prepared mixture-coating material is applied onto a collector and dried. The collector is not specifically limited and may be any electron-conducting substance that does not undergo a chemical change when it is formed into a battery. For example, the collector may be formed of aluminum, an aluminum alloy, nickel, stainless steel, titanium, or the like. Besides these metals, aluminum or stainless steel whose surface is treated with carbon, nickel, or titanium may be used as well. Especially, aluminum or an aluminum alloy is preferable. The collector may have a foil-like, film-like, net-like, porous, foamed, or the like shape. The thickness of the collector is 1 to 100 μm, preferably 1 to 50 μm.

The electrode active material mixture-coating material is applied onto the collector by an ordinary well-known coating method such as the reverse roll method, direct roll method, blade method, knife method, extrusion nozzle method, curtain method, gravure roll method, bar coat method, dip method, kiss coat method, squeeze method, and the like. Among these, it is preferable to adopt the extrusion nozzle method, whereby a good surface state of the coating layer can be obtained by suitably selecting the solvent composition of the mixture and the drying condition so that the coating material is applied onto the collector at a coating speed of 5 to 100 m/min.

The drying temperature is preferably 30 to 150° C., more preferably 50 to 140° C. If the drying temperature is less than 30° C., the solvent will not be sufficiently dried. On the other hand, if the drying temperature exceeds 150° C., the binder may not be distributed uniformly on the surface of the electrode because the evaporation speed of the solvent is too high, thereby leading to deterioration in the electrode properties.

Here, the thickness, length, and width of the coating layer is determined by the final size of the battery to be obtained. The thickness of the coating layer is preferably adjusted by the ordinarily-adopted calendar processing after the coating step. The processing pressure is preferably 0.2 to 10 t/cm, and the processing temperature is preferably 10 to 150° C.

MODE FOR CARRYING OUT THE INVENTION

Figure 1:
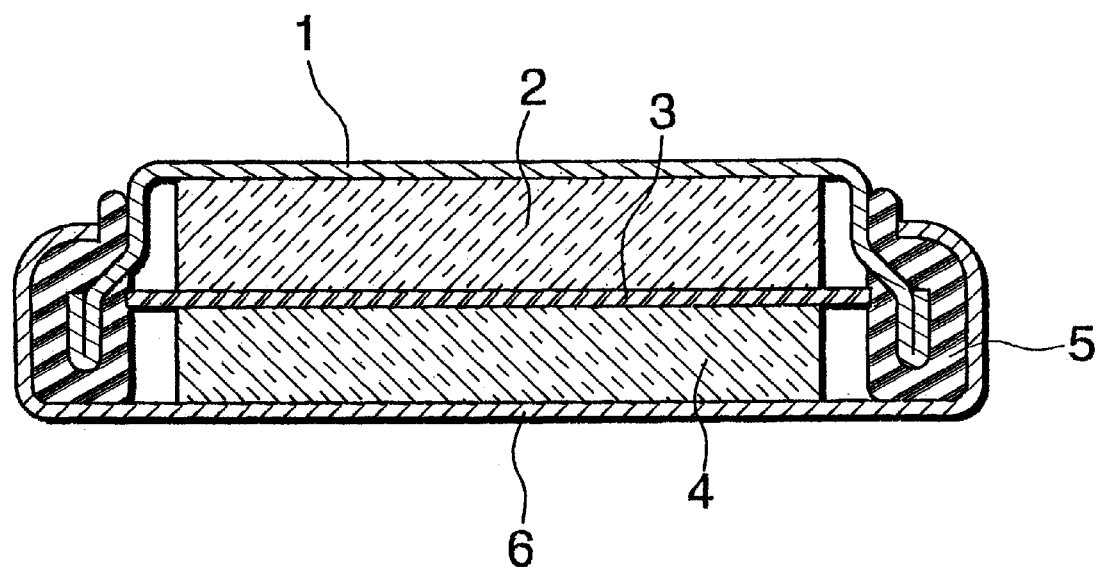
FIG. 1 is a cross-sectional view illustrating a coin-type battery used in examples of the present invention for measurement of battery characteristics.

Hereafter, the present invention will be more specifically explained with reference to examples shown below. However, the present invention is not limited by these examples.

EXAMPLE 1

A positive electrode active material mixture-coating material was prepared in the following manner.
(Composition of blending)

| | |
|---|---|
| Positive electrode active material: $LiNi_{0.82}Co_{0.18}O_2$ (DC-118 manufactured by Seimi Chemical Co., Ltd.) | 94 parts by weight |
| Electrically conductive agent: flake graphite (KS 25 manufactured by LONZA Co., Ltd.) | 3 parts by weight |
| Binder: polyvinylidene fluoride (PVDF) (KYNAR741 manufactured by ELF-ATOCHEM Japan) | 3 parts by weight |
| Solvent: N-methyl-2-pyrrolidone (NMP) | 37 parts by weight |

PVDF (3 parts by weight) was dissolved In NMP (27 parts by weight) to prepare a binder solution (30 parts by weight). The active material (94 parts by weight), the electrically conductive agent (3 parts by weight), and the binder solution (19 parts by weight) were introduced into a planetary mixer for conducting a kneading process for one hour. The temperature of the slurry at the time of the kneading step was 50° C. Here, an inside of a vessel of the planetary mixer was maintained in a nitrogen atmosphere with a moisture dew point of −50° C.

The kneaded slurry was diluted by adding the binder solution (11 parts by weight) and NMP (10 parts by weight), and then the slurry was subjected to a dispersion process in a Gaulin homogenizer to prepare a positive electrode active material mixture-coating material.

The prepared mixture-coating material was applied onto one surface of a collector of aluminum foil of 20 μm thickness by means of an extrusion nozzle and dried at 120° C. Then, the mixture-coating material was applied to the other surface of the collector in a similar manner and dried. The obtained coated collector was press-molded by a roller press machine and cut into a given size. Thereafter, the mixture coating film on one side of the collector was peeled off to obtain an electrode of Example 1 having a mixture layer of 65 μm thickness.

EXAMPLE 2

A mixture-coating material was prepared in the same manner as in Example 1 except that the dispersion process was carried out by means of an ultradisper instead of the Gaulin homogenizer of Example 1, to fabricate an electrode of Example 2.

EXAMPLE 3

A positive electrode active material mixture-coating material was prepared in the following manner.
(Composition of blending)

| | |
|---|---|
| Positive electrode active material: $LiNi_{0.82}Co_{0.18}O_2$ (DC-118 manufactured by Seimi Chemical Co., Ltd.) | 94 parts by weight |
| Electrically conductive agent: acetylene black (manufactured by Denki Kagaku Kogyo K.K.) | 3 parts by weight |
| Binder: polyvinylidene fluoride (PVDF) (KYNAR741 manufactured by ELF-ATOCHEM Japan) | 3 parts by weight |
| Solvent: N-methyl-2-pyrrolidone (NMP) | 50 parts by weight |

PVDF (3 parts by weight) was dissolved in NMP (27 parts by weight) to prepare a binder solution (30 parts by weight).

The active material (94 parts by weight), the electrically conductive agent (3 parts by weight), and the binder solution (28 parts by weight) were introduced into a planetary mixer for conducting a kneading process for one hour. The temperature of the slurry at the time of the kneading step was 50° C. Here, an inside of a vessel of the planetary mixer was maintained in a nitrogen atmosphere with a moisture dew point of −50° C.

The kneaded slurry was diluted by adding the binder solution (2 parts by weight) and NMP (23 parts by weight), and then the slurry was subjected to a dispersion process in a Gorin homogenizer to prepare a positive electrode active material mixture-coating material.

The prepared mixture-coating material was applied onto a collector in the same manner as in Example 1 to fabricate an electrode of Example 3.

COMPARATIVE EXAMPLE 1

The blending composition of the positive electrode active material mixture-coating material was the same as in Example 1.

The positive electrode active material (94 parts by weight), the electrically conductive agent (3 parts by weight), the binder (3 parts by weight), and the solvent (37 parts by weight) were introduced into a hyper mixer, where they were stirred and mixed for one hour to produce an active material mixture-coating material. Here, an inside of the hyper mixer was maintained in a nitrogen atmosphere with a moisture dew point of −50° C.

The prepared mixture-coating material was applied onto a collector in the same manner as in Example 1 to fabricate an electrode of Comparative Example 1.
(Battery Characteristics)

The battery characteristics of each of the electrodes obtained in Examples 1 to 3 and Comparative Example 1 were measured in the following manner.

Each of the obtained electrodes was dried for removal of residual moisture in the positive electrode active material layer to fabricate a circular positive electrode having a diameter of 15.5 mm. Separately, metal lithium having a thickness of 1.85 mm was cut into a circular shape with a diameter of 15.5 mm as a negative electrode. Further, a non-aqueous electrolyte solution was prepared by dissolving $LiPF_6$ at a concentration of 1 mol/liter in a mixture solvent containing ethylene carbonate and dimethyl carbonate at a ratio of 1:1 (volume ratio).

A coin-type battery having a diameter of 20 mm×thickness of 2.5 mm was prepared, as shown in FIG. 1, by using the non-aqueous electrolyte solution, the positive electrode, the negative electrode, a thin film separator made of polypropylene, a negative electrode cup, a positive electrode can, and a gasket. In the coin-type battery of FIG. 1, the positive electrode (4) housed in the positive electrode can (6) and the negative electrode (2) housed in the negative electrode cup (1) are laminated through the intermediary of the separator (3); and the positive electrode can (6) and the negative electrode cup (1) are caulked and sealed through the intermediary of the gasket (5). In FIG. 1, the collector is not shown.

The batteries thus fabricated were charged under a condition with a charge voltage of 4.2V, a charge current of 1 mA, and a charge time of 20 hours, and then discharged under a condition with a discharge current of 1 mA and an final voltage of 3.0V to determine their charge/discharge capacities. The results are shown in Table 1.

TABLE 1

| | Charge Capacity (mAh/g) | Discharge Capacity (mAh/g) |
|---|---|---|
| EXAMPLE 1 | 213 | 188 |
| EXAMPLE 2 | 211 | 186 |
| EXAMPLE 3 | 216 | 190 |
| COMPARATIVE EXAMPLE 1 | 188 | 160 |

From Table 1, it will be understood that the batteries with electrodes of Examples 1 to 3 each have large charge/discharge capacities. In contrast, the battery of Comparative Example 1 has small charge/discharge capacities. In other words, high battery characteristics were obtained with addition off the same amount of the electrically conductive agent by wet-kneading the slurry and then conducting the dispersion process by means of a narrow-gap-type dispersing apparatus as in the Examples in preparing the active material mixture-coating material.

The present invention can be carried out in any other embodiments without departure to the spirit and major characteristics of the present invention. Accordingly, the above examples are described merely for illustrative purposes and these should not be construed as restrictive. Further, any modification within the equivalent to the claims is intended to fall under the scope of the present invention.

INDUSTRIAL APPLICABILITY

As shown and described above, according to the present invention, since the slurry is wet-kneaded and then subjected to the dispersion process by means of the narrow-gap-type dispersing apparatus in preparing the active material mixture-coating material, a sufficient electric conductivity of the electrode can be obtained with a small amount of the electrically conductive agent. As a result, an amount of the active material per unit electrode volume can be increased and large charge/discharge capacities per unit electrode volume can be obtained. Also, physical properties of the coating film can be stabilized.

The present invention contributes to improvement of the charge/discharge characteristics such as a discharge capacity and a charge/discharge cycle life of a non-aqueous electrolyte battery and to improvement of physical properties of the electrode coating film.

What is claimed is:

1. A method for producing an electrode for a non-aqueous electrolyte battery by preparing an electrode active material mixture-coating material containing at least an active material having a composition of $Li_xNi_yM_zO_2$ where x satisfies $0.8<x<1.5$, y+z satisfies $0.8<y+z<1.2$, z satisfies $0\leq z<0.35$, and M is at least one element selected from Co, Mg, Ca, Sr, Al, Mn and Fe, an electrically conductive agent and a binder, and by applying said active material mixture-coating material on a collector, said method comprising the steps of wet-kneading a slurry containing at least said active material, said electrically conductive agent, said binder and an organic solvent, and then performing a dispersion process on said wet-kneaded slurry by means of a narrow-gap dispersing apparatus to prepare the mixture-coating material.

2. A method for producing an electrode for a non-aqueous electrolyte battery according to claim 1, wherein a concentration of solid components in the slurry at the wet-kneading step is 70 to 90 wt %.

3. A method for producing an electrode for a non-aqueous electrolyte battery according to claim 1 or 2, wherein the wet-kneading step is performed in an atmosphere of air, nitrogen gas, or a rare gas having a moisture dew point of not more than −20° C.

* * * * *

UNITED STATES PATENT AND TRADEMARK OFFICE
CERTIFICATE OF CORRECTION

PATENT NO. : 6,497,979 B1
DATED : December 24, 2002
INVENTOR(S) : Iijima et al.

It is certified that error appears in the above-identified patent and that said Letters Patent is hereby corrected as shown below:

<u>Title page, Item [54] and Column 1, lines 1-4,</u>
The Title should read: -- METHOD OF PRODUCING ELECTRODE FOR NON-AQUEOUS ELECTROLYTE BATTERY --

Signed and Sealed this

Fifteenth Day of April, 2003

JAMES E. ROGAN
*Director of the United States Patent and Trademark Office*